United States Patent [19]
Scott

[11] Patent Number: 5,979,482
[45] Date of Patent: Nov. 9, 1999

[54] REMOVABLE CAPTIVE PLUNGER WITH CONTAMINATION PROTECTION

[75] Inventor: Loren W. Scott, Carlsbad, Calif.

[73] Assignee: Hunter Industries, Inc., San Marcos, Calif.

[21] Appl. No.: 09/054,151

[22] Filed: Apr. 2, 1998

[51] Int. Cl.[6] ................................................ F16K 31/40
[52] U.S. Cl. ........................... 137/15; 251/30.02; 251/46
[58] Field of Search .............................. 251/30.01, 30.02, 251/30.03, 30.04, 30.05, 45, 46, 129.15, 129.17

[56] References Cited

U.S. PATENT DOCUMENTS

| | | | |
|---|---|---|---|
| 3,439,895 | 4/1969 | Marandi | 251/30.02 |
| 3,591,126 | 7/1971 | Hauser | 251/30.02 |
| 3,735,772 | 5/1973 | Hunter et al. | 251/30.02 |
| 3,740,019 | 6/1973 | Kessell et al. | 251/129.17 |
| 3,743,240 | 7/1973 | Merriner et al. | 251/129.17 |
| 3,788,400 | 1/1974 | Tufts | 251/30.02 |
| 3,791,619 | 2/1974 | Pett | 251/45 |
| 4,081,171 | 3/1978 | Morgan et al. | 251/30.02 |
| 4,135,696 | 1/1979 | Saarem et al. | 251/30.02 |
| 4,180,236 | 12/1979 | Sareem et al. | 251/30.02 |
| 4,301,992 | 11/1981 | Karbo | 251/30.02 |
| 4,336,918 | 6/1982 | Karbo | 251/30.02 |
| 4,826,132 | 5/1989 | Moldenhauer | 251/129.17 |
| 4,893,645 | 1/1990 | Augustinas et al. | 251/46 |
| 4,967,996 | 11/1990 | Sonoda et al. | 251/30.02 |
| 5,127,625 | 7/1992 | Kleinhappl | 251/129.17 |
| 5,133,382 | 7/1992 | Nielsen | 251/30.02 |
| 5,213,303 | 5/1993 | Walker | 251/30.02 |

*Primary Examiner*—George L. Walton
*Attorney, Agent, or Firm*—Michael H. Jester

[57] ABSTRACT

A diaphragm-type control valve for irrigation systems has a solenoid operated pilot valve assembly. The solenoid includes a housing having a generally cylindrical bore with an open end, an energizeable coil surrounding the bore, a ferrous plunger reciprocally mounted in the bore and having an end extending from the open end of the solenoid housing, the plunger moveable between an extended position and a retracted position, and an elastomeric sealing cap mounted on the plunger end and having a central portion for sealingly engaging a valve seat and a peripheral portion sealing the bore around the plunger.

4 Claims, 4 Drawing Sheets

REMOVABLE CAPTIVE PLUNGER WITH CONTAMINATION PROTECTION

BACKGROUND OF THE INVENTION

The present invention relates to irrigation systems and pertains particularly to an improved pilot valve assembly for solenoid actuated irrigation control valves.

The use of valve controlled pressurized irrigation systems for supplying water for the irrigation of plants is extensive throughout the world today. One of the most prevalent systems, particularly for lawn areas and playing or athletic fields, is the sprinkler system wherein a plurality of sprinkler units are positioned about a land area for distributing water over the surface of the land area. One or more control valves connect and disconnect water from a pressurized main supply line to one or more branch lines having sprinkler units.

Commercial, industrial, municipal and golf course irrigation systems increasingly rely on alternative water sources including reclaimed water as an irrigation water source. This trend has been prompted by an often critical need to conserve water in most regions of the country. Other alternative water sources include lakes, reservoirs, wells, and the like. However, since water from these sources often contains dirt, sand and other particles and debris, its use has brought with it an increase in the incidence of clogging of various components of irrigation systems. While the obvious solution is simply to filter the water entering the irrigation system, the cost of such filters, and their maintenance, limits the degree of filtering that is economically feasible.

The problem of clogging in irrigation systems is most acute in areas in the system where water must pass into and around small spaces and through small openings. Such systems having small openings occur, for example, in irrigation systems having pilot operated and pressure responsive control valves, pressure regulating valves, in drip systems, and in other low flow irrigation configurations. Another area where dirt and debris cause problems is where the water comes into contact with moving parts. One example where such problems occur is in small solenoid operated plunger valves which have a small valve seal on the end of a plunger which extends into a water passage and acts as a pilot valve.

Pressure responsive and pressure regulating valves used in irrigation systems typically have a main diaphragm valve that is normally pilot operated. Upstream or inlet water pressure passes via a small passage to the back of the main diaphragm valve to apply valve closing pressure. The water is vented from the back of the diaphragm valve via a small passage controlled by a solenoid operated pilot valve to the down stream side of the valve.

The pilot valve is normally operated by a plunger of a solenoid that moves back and forth in a bore in a housing surrounded by a coil with the valve seal being an elastomeric disc on the end of the plunger which selectively engages a valve seat. The water controlled by the pilot valve typically flows around and frequently along between the pilot valve plunger and its housing either during pressurization or venting of the control valve. Dirt and debris in the water frequently jam between the plunger and its housing preventing its normal operation. Sealing around or between the plunger and its housing is difficult because the plunger must be free to move and air or other fluids must be free to move in and out of the bore along the plunger.

Accordingly, there is a need for an irrigation control valve with a solenoid that is protected from contamination.

SUMMARY AND OBJECTS OF THE INVENTION

Accordingly, it is a primary object of the present invention to provide an improved pilot valve having improved sealing means for the solenoid assembly.

Another object of the present invention to provide a diaphragm-type control valve with an improved solenoid actuated pilot valve that is less susceptible to fouling from debris.

In accordance with the primary aspect of the present invention, a solenoid actuated pilot valve assembly for a diaphragm-type control valve includes an elastomeric sealing cap that seals a valve seat on the valve housing and prevents debris from entering and fouling the solenoid.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
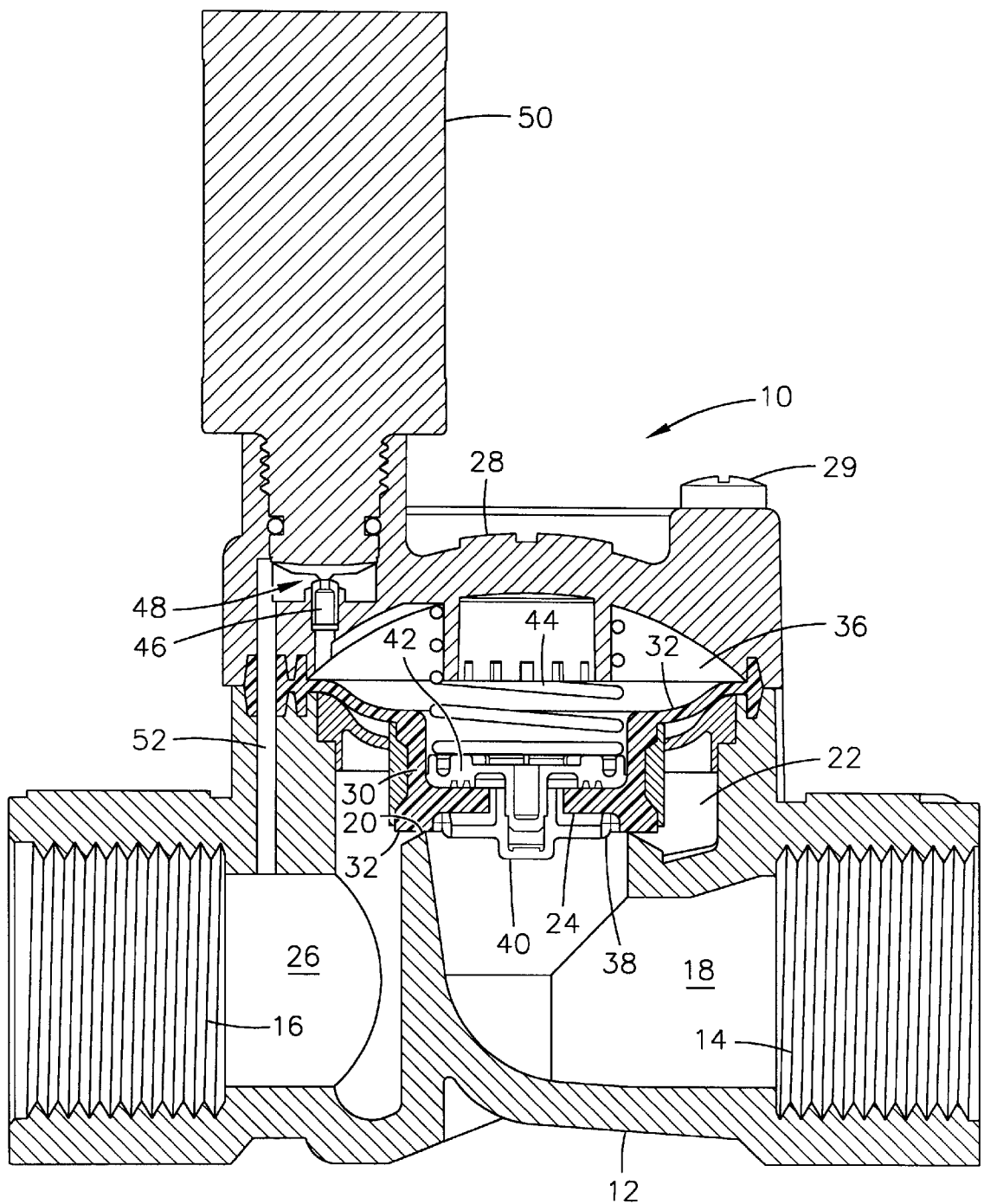
FIG. 1 is a vertical sectional view of an exemplary control valve of a type commonly used in irrigation systems incorporating a solenoid actuated pilot valve in accordance with the present invention.

Referring to FIG. 1, there is illustrated an exemplary pilot operated control valve designated generally by the numeral 10 of a type commonly used in irrigation systems. This valve is a diaphragm-type valve which includes a housing 12 having female threaded inlet port 14 for connecting to a source of irrigation water and a female threaded outlet port 16 for connecting to a line that leads to one or more sprinkler units. The valve housing 12 has a passage 18 from the inlet port 14 that terminates at a primary circular valve seat 20 defining and opening into a main valve chamber 22 in which a flexible diaphragm valve 24 is located. The main valve chamber 22 communicates via a downstream passage 26 to the outlet port 16. The diaphragm valve 24 engages and disengages the primary valve seat 20 to control the flow of water from the inlet port 14 to the outlet port 16. This is accomplished by moving the diaphragm valve 24 from the primary valve seat 20 to turn the control valve on ON and OFF. The housing 12 includes a removable generally dome shaped cap 28 which engages and retains the valve 24 and is held in place by screw 29.

The diaphragm valve 24 is typically made of an elastomeric material. It comprises a central generally cylindrical body 30 having an annular seal 32 for sealing engagement with the primary valve seat 20. A flexible membrane 32 extends radially outward from the central body 30 with an annular sealing bead sealingly engaged in opposing grooves of the housing 12 and the cap 28. A pressure control chamber 36 is formed above the diaphragm valve 24 wherein pressurized water acts on the top of the diaphragm valve 24 to force the valve in the closed position. As illustrated in FIG. 1, the valve is in the OFF position, since the diaphragm seal 32 is in contact with the primary valve seat 20.

Pressurized water from the inlet port 14 flows via a metered passageway through the central area of the diaphragm valve 24 to the pressure chamber 36 to force the valve 24 against its primary valve seat 20 to close the valve. The passageway includes screen openings 38 in an annular plate 40, through the center of the valve 24 and through passages in retainer disc 42 on the upper surface of the central portion of the diaphragm valve 24. A coil spring 44 is disposed between the housing cap 28 and valve 24 to apply a light biasing force on top of the valve 24 forcing it toward the primary valve seat 20.

Pressurized water in chamber 36 above the diaphragm valve 24 forces the valve into sealing engagement with its seat 20 to a closed position. The pressurized water can be vented from chamber 28 via a pilot valve passage 46 controlled by a pilot valve generally designated 48. The pilot valve 48 is actuated by a solenoid 50 to allow water from the pilot valve passage 46 to enter a pressure relief passage 52. Water from the pressure relief passage 52 flows to the downstream passage 26 to the outlet port 16. This relieving of pressure enables pressurized inlet water to force the valve 24 from the primary valve seat 20 to open the valve to enable flow of water directly between the passages 18 and 26. Closing of the pilot valve 48 enables build up of pressure in chamber 28 and closing of valve 24.

Figure 2:
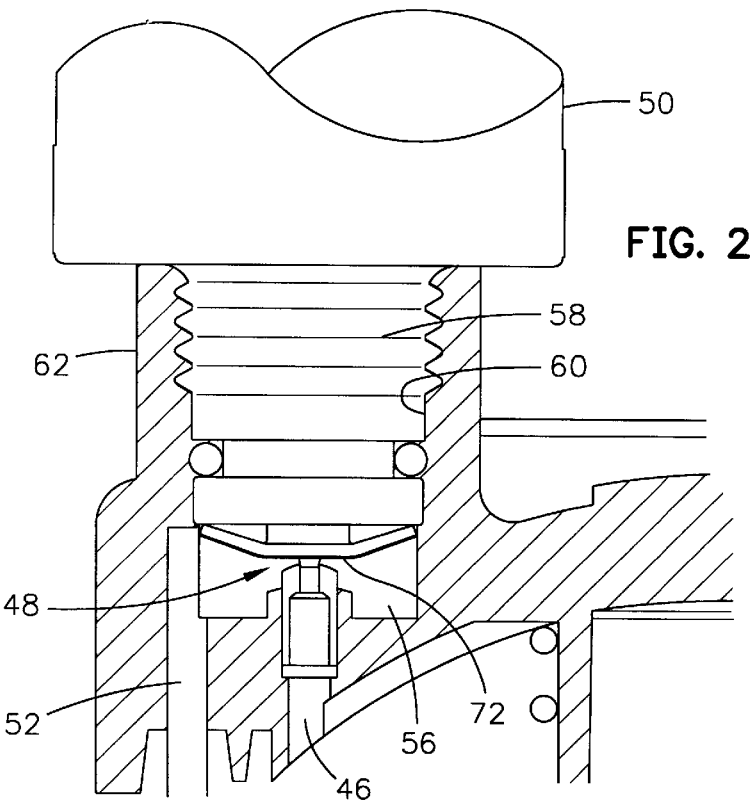
FIG. 2 is an enlarged partial side elevation and partial vertical sectional view of the pilot valve of FIG. 1 showing the pilot valve in its closed position.
Figure 3:
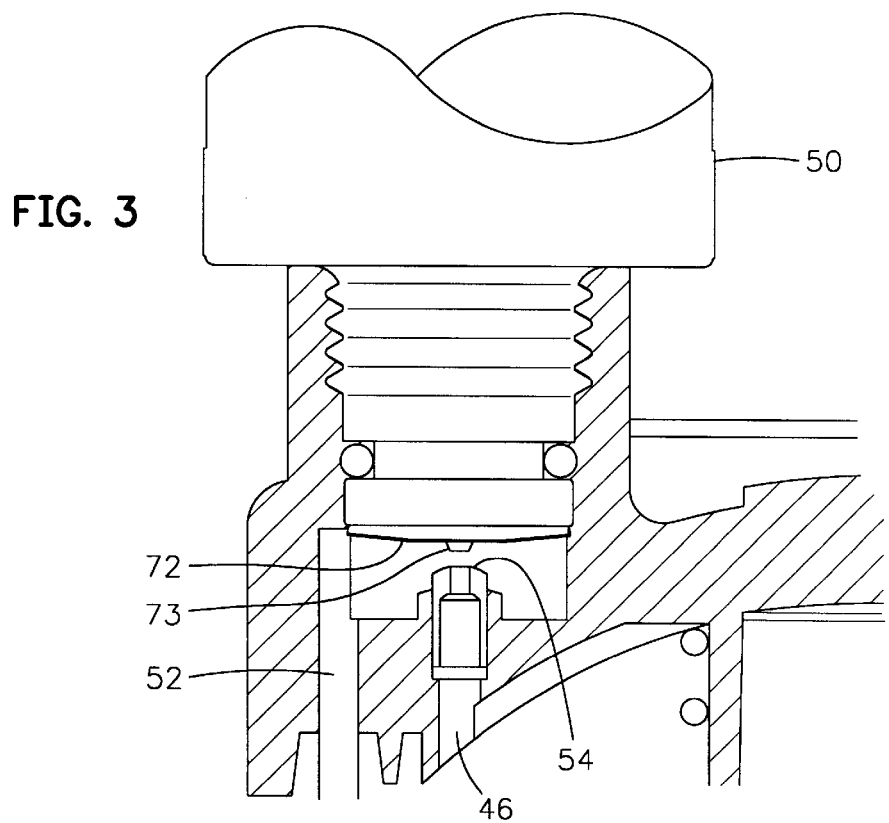
FIG. 3 is a view similar to FIG. 2 showing the pilot valve in its open position.

The pilot valve 48, as best illustrated in FIGS. 2 and 3, comprises a valve seat 54 (FIG. 3) at the termination of passage 46 which opens into a pilot valve chamber 56 (FIG. 2). The pilot valve chamber 56 communicates with the passage 52 which vents to the downstream passage 26 of the control valve 10. The solenoid 50 is detachably mounted, such as by male threads 58 in a female threaded bore 60 of a tubular solenoid mounting extension or shoulder 62 of the housing cap 28. The bore 60 is coaxial with the passage 46 and thus the valve seat 54. The pilot valve 48 further comprises an elastomeric sealing cap 70 (FIG. 4A) defining a combined elastomeric valve and plunger seal. The sealing cap 70 is mounted on an end of a ferrous core plunger 64 which acts as an armature of the solenoid 50. A central planar disc portion 72 of the sealing cap 70 engages the valve seat 54 when the pilot valve is closed (FIG. 2) and is pulled away from the valve seat 54 when the pilot valve is open (FIG. 3).

Figure 4A:
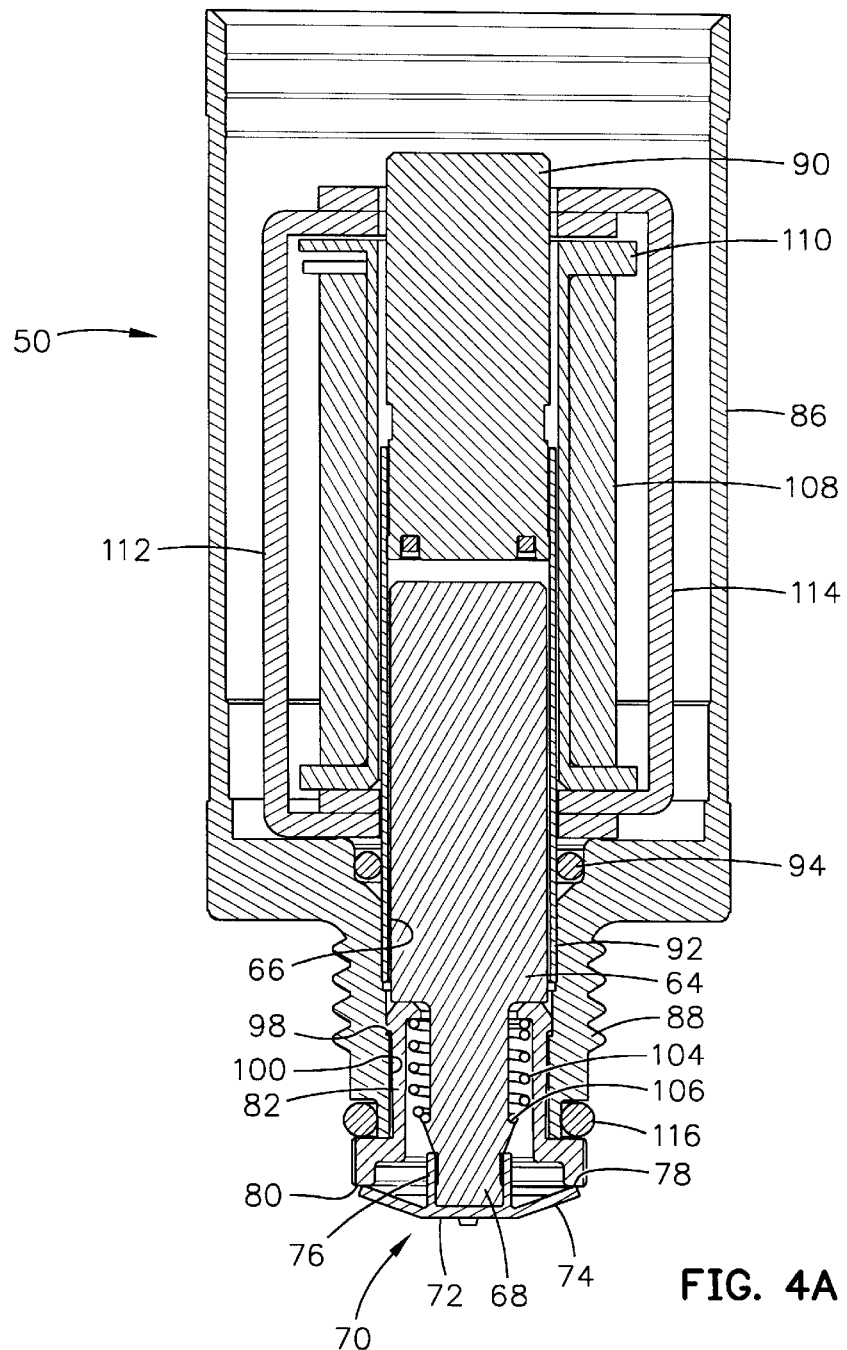
FIG. 4A is a vertical sectional view illustrating details of the solenoid and the sealing cap of the pilot valve in their OFF or non-energized positions.

As best seen in FIG. 4A, the sealing cap 70 is mounted on the lower end of the plunger 64. The plunger 64 is mounted for reciprocally moving within a bore 66 of the solenoid housing 86. The plunger 64 also functions as a valve actuator and is formed with a forwardly projecting coaxially disposed tip 68 on which is mounted the sealing cap 70. The sealing cap 70 has a generally disc configuration including the central circular planar disc portion 72 and an outer sloped peripheral disc portion 74. The disc portion 72 and the sloped extension 74 form a generally frusto-conical configuration as shown in FIG. 2 when the solenoid 50 is de-energized, allowing the plunger 64 to descend and push the disc portion 72 against the valve seat 54. The peripheral disc portion 74 flattens out to when the solenoid 50 is energized to pull the sealing cap 70 away from the valve seal 54. Thus, in its normal relaxed configuration the sealing cap 70 has the frusto-conical configuration illustrated in FIG. 2.

A centrally coaxially disposed cylindrical boot 76 extends from the inside surface of the sealing cap 70 and forms a socket for receiving the lower end of the plunger tip 68. The front or outer face of the central circular planar disc portion 72 of sealing cap 70 includes a small projection or teat 73 which extends onto the pilot valve passage 46 as the sealing cap 70 engages the valve seat 54, as shown in FIG. 2, for closing the pilot valve 48. An outer peripheral edge 78 (FIG. 4) of the outer peripheral disc portion 74 engages an end surface 80 (FIG. 4A) of a generally cylindrical retainer sleeve 82 for the plunger 64 and sealingly closes the space between the plunger and the retainer sleeve 82 against contaminants from water flowing through the valve 10. The resilient flexible nature of the outer peripheral disk portion 74 of the sealing cap 70 enables it to act as a one-way valve to vent the plunger chamber as the plunger 64 moves inward. The sealing cap 70 flexes from a relaxed generally cup-shaped configuration as shown in FIG. 4A. to a substantially flat disc configuration as shown in FIG. 5.

The plunger 64 (FIG. 4A) forms the armature for the solenoid 50 and is actuated by an electrical coil in the usual manner. The overall solenoid 50 comprises an outer housing or shell 86 which is in a generally cylindrical tubular configuration with a reduced diameter neck portion 88 at one end on which is formed the male threads 58 for mounting in the threaded bore 60 of the housing 12 of the control valve 10. The retainer sleeve 82 forms the lowermost part of the solenoid housing 86. The core assembly of the solenoid 50 comprises the plunger 64 and a plug magnet 90 mounted within the housing 86. An elongated tubular sleeve 92 is secured to an end of the magnet 90 and extends toward the forward end of the housing in which the plunger 64 is mounted for reciprocation. An O-ring seal 94 seals the outer surface of the sleeve 92 in the housing 86.

The plunger 64 (FIG. 4A) is retained within the housing by the interference or snap-fit of the retainer sleeve 82. The retainer sleeve 82 includes a slightly enlarged radial diameter portion 96 forming a shoulder which fits behind a shoulder 98 formed behind bore 100 in the neck portion 88 of the housing 86. The snap-fit retainer 82 includes an inwardly extending flange 102 which captures a spring 104. The spring 104 engages at the opposite end with a shoulder 106 on the plunger 64 to bias it to the outwardly extended position and to the valve closed or OFF position. An electrical coil 108 wound on a spool 110 surrounds the core assembly 90 and plunger 64. When the coil 108 is energized the plunger 64 is drawn into engagement with the plug magnet 90. This acts to open the valve pulling the sealing cap 70 away from the valve seat 54 enabling water or fluid to flow from passage 46 to passage 52 and exit the pressure chamber 36. A pair of yokes 112 and 114 surround the coil and enhance the magnetic field. The space inside the housing 86 surrounding the coil 108 is filled (potted) with a material such as a suitable epoxy. This pilot valve assembly can be used in a vide variety of valve applications.

In operation, when the solenoid plunger 64 is in the down position (FIG. 1), no water is allowed to flow out of the pressure chamber 36 through the diaphragm outlet passage 46 and 52. As a result, pressure in the diaphragm chamber 36 builds up to equal the pressure in the inlet port 14. However, the area above the diaphragm 24, which is affected by the pressure in the diagram chamber 36, is greater than the area below the diaphragm seal 24, which is affected by the pressure in the passage 18. As a consequence, there is a resultant downward force on the diaphragm valve 24 which causes it to close the diaphragm seal 32 on the valve seat 20. The valve 10 is then in the closed or OFF position and no water can flow from the inlet port 14 to the outlet port 16.

When the solenoid 50 is energized by an electrical signal from an irrigation controller (not shown) carried on a wire (not shown), the plunger 64 moves up, pulling the sealing cap 70 out of engagement with the valve seat 54 (FIG. 3). This permits water to flow out of the pressure chamber 36 and then to the outlet port 16 by way of the diaphragm outlet passages 46 and 52. As a result, pressure in the chamber 36 will decrease enough so that the pressure at the inlet port 14 is higher by an amount sufficient to raise the diaphragm valve 24 off the valve seat 20. This allows water to flow from the inlet port 14 past valve seat 20 and directly into the outlet port 16. When the solenoid 50 is de-energized, the force of the spring 104 pulls the plunger 64 downward, pushing the sealing cap 70 into engagement with the valve seat 54 (FIG. 2). The teat 73 on the sealing cap 70 covers and seals the passage 46. Pressure then builds up in the chamber 36, causing the diaphragm valve 24 to close onto the seat 20, closing the valve 10.

Figure 4B:
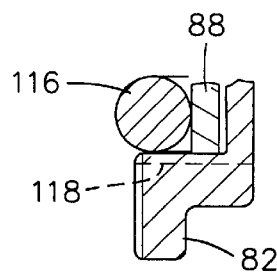
FIG. 4B is an enlarged portion of FIG. 4A illustrating the vent passage in the lowermost portion of the solenoid housing.
Figure 5:
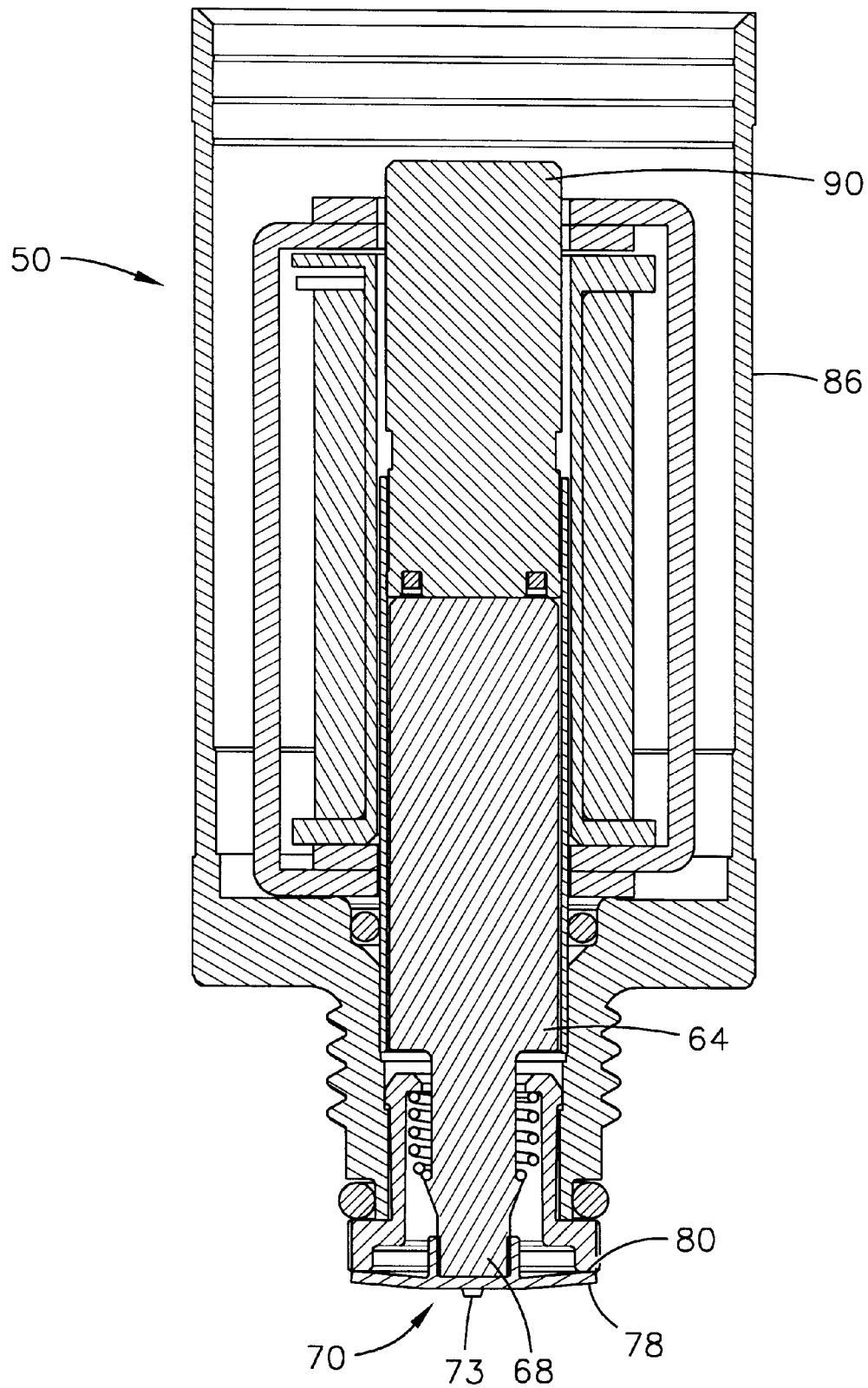
FIG. 5 is a view similar to FIG. 4A showing the solenoid and sealing cap in their ON or energized positions.

Referring to FIG. 4B, an elastomeric O-ring 116 is positioned around the lower end of the neck portion 88 of the housing 86 and abuts a shoulder formed at the lower end of the sleeve 82. A radially extending vent passage 118 (shown as a dashed line) extends through the sleeve 82 to equalize air pressure inside the sleeve 82 to ambient. Otherwise, the force of the spring 104 might not be sufficient to close the passage 46.

The sealing cap 70 not only selectively seals the pilot valve passage 46, but also prevents debris from entering and fouling the solenoid 50. The sealing cap 70 can be readily removed and replaced. The minimal throw or travel of the solenoid plunger 64 permits the sealing cap 70 to both seal and unseal the pilot valve passage 54 while its peripheral disc portion 74 remains in sealing contact with the end surface 80 of the retainer sleeve 82 of the solenoid housing 86.

While I have illustrated and described my invention by means of specific embodiments, it should be understood that numerous changes and modifications may be made therein without departing from the spirit and scope of the invention as defined in the appended claims:

I claim:

1. A control valve for an irrigation system, comprising:

a valve housing having an inlet port, an outlet port, a primary valve seat between the inlet port and the outlet port, a pressure control chamber above the primary valve seat, a pilot valve seat, a pilot valve passage extending through the pilot valve seat and communicating with the pressure control chamber, a pilot valve chamber surrounding the pilot valve seat, a solenoid mounting shoulder adjacent the pilot valve chamber, and a pressure relief passage connecting the pilot valve chamber to the outlet port;

a flexible diaphragm valve having an annular portion normally seated on the primary valve seat to seal the inlet port from the outlet port, the diaphragm valve having means for metering pressurized water from the inlet port through a center of the diaphragm valve to the pressure control chamber, and the annular portion of the diaphragm valve being deformable to unseal from the primary valve seat upon release of a sufficient amount of pressurized water from the pressure control chamber through the pilot valve passage; and a solenoid actuated plunger valve assembly connected to the solenoid mounting shoulder of the valve housing including a plunger reciprocable within a solenoid housing, and an elastomeric sealing cap mounted on an end of the plunger for selectively engaging and disengaging the pilot valve seat to open and close the pilot valve passage, the sealing cap having a circular planar central portion and an outer peripheral disk portion, the circular planar central portion and the outer peripheral disk portion having a generally flat configuration when the solenoid is energized to retract the plunger from the pilot valve seat and the circular planar central portion and the peripheral disk portion forming a frusto-conical configuration when the solenoid is de-energized to extend the plunger toward the pilot valve seat and push the circular planar central portion against the valve seat, and a range of travel of the plunger between the energized and non-energized states of the solenoid is such that the peripheral disk portion of the sealing cap stays engaged with a lower end surface of the solenoid housing at all times to thereby provide a seal between the plunger and the solenoid housing to prevent the entry of debris into the solenoid housing.

2. A control valve according to claim 1 wherein the sealing cap has a central teat extending from the circular planar disk portion of the sealing cap that covers and seals a terminal end of the pilot valve passage.

3. A control valve according to claim 1 wherein the solenoid housing has a radially extending vent passage to equalize air pressure within the solenoid housing to that of the ambient atmosphere to ensure that the sealing cap will engage the pilot valve seat and close the pilot valve passage.

4. A method of preventing the fouling of a solenoid-operated pilot valve of a diaphragm valve installed in an irrigation system that uses water containing dirt and other debris, comprising the steps of:

connecting a diaphragm valve with a solenoid-operated pilot valve between a source of water containing dirt and debris and a plurality of sprinklers positioned for distributing the water over a land area; and providing an elastomeric sealing cap over an end of a solenoid housing of the solenoid-operated pilot valve so that a plunger of the solenoid-operated pilot valve can selectively deform the sealing cap to selectively engage and disengage a portion of the sealing cap with a pilot valve passage of the diaphragm valve upon de-energization and energization of the solenoid-operated pilot valve, the plunger having minimal throw so that a central portion of the sealing cap can seal and unseal the pilot valve passage when the sealing cap assumes substantially frusto-conical and substantially flat configurations, respectively, while a peripheral portion of the sealing cap maintains a seal with an end surface of the housing of the solenoid-operated pilot valve at all times so that dirt and debris in the water will be prevented from entering between the plunger and the housing of the solenoid-operated pilot valve that would otherwise lead to fouling and improper operation of the solenoid-operated pilot valve.

\* \* \* \* \*